J. DILLMAN.
CANDLE MOLDING MACHINE.
APPLICATION FILED DEC. 9, 1919.

1,390,257.

Patented Sept. 6, 1921.
3 SHEETS—SHEET 3.

Inventor:
Joseph Dillman
By Word-Word
Attorneys

UNITED STATES PATENT OFFICE.

JOSEPH DILLMAN, OF CINCINNATI, OHIO, ASSIGNOR TO HOMAN & COMPANY, OF CINCINNATI, OHIO, A FIRM COMPOSED OF LOUIS B. HOMAN AND JOSEPH T. HOMAN.

CANDLE-MOLDING MACHINE.

1,390,257.  Specification of Letters Patent.  Patented Sept. 6, 1921.

Application filed December 9, 1919. Serial No. 343,472.

*To all whom it may concern:*

Be it known that I, JOSEPH DILLMAN, a citizen of the United States, and residing at 1050 Findlay street, Cincinnati, in the county of Hamilton and State of Ohio, have invented a new and useful Improvement in Candle-Molding Machines, of which the following specification is a full disclosure.

This invention relates to candle molding machines and particularly to the type adapted for molding cup candles or night lights in which the wick is inserted in the candle stock after molding. Such style of candle is designed for a long burning capacity, in compact size, to fit entirely within a cup or like holding receptacle, and after lighting the wax is reduced to a molten mass. The fiber wicking is stabilized or reinforced with one or more strands of very fine wire and fixed to a sheet metal base clipped into the base of the candle, which construction makes it necessary to insert the wicking after the candle has been molded.

The candle is molded with a central bore or opening through its body and head or tip, and heretofore during the process of molding, after the wax has set in the mold, the wick opening at the head is plugged or clogged, in scraping the wax from the trough across the head of the mold. This prevents the free insertion of the wicking and necessitates additional manual labor for punching or puncturing the head or tip end of each candle.

These candles with a tapered body are molded head or tip upward while with a straight body the head or tip may be downward, in either case the bore has to be cleared at the sprue end after molding.

An object of the invention is to provide a candle molding machine which will discharge a "cup candle" or night light from the mold base with a free wick opening therethrough, with greater facility and speed.

Another object of the invention is to provide a candle molding machine for molding "cup candles" or night lights having a central wick opening therethrough, with means for puncturing the sprue or head with the discharge of the candle from the mold.

Other objects relate to combinations of parts which will perform the various operations of molding candles, piercing the same for the reception of wicks, and deliver a molded candle finished to receive the wick inserts, all of which will be more fully disclosed from the following description of the accompanying drawings, forming a part of the specification, and in the drawings like characters of reference denoting corresponding parts throughout the several views, of which:

The numeral 1 designates generally the supporting frame, 2 the water chamber of hollow cast construction, mounted thereon, provided at its top surface with water intake pipe 3, at its interior with overflow pipes 4 at opposite sides thereof, and with a centrally located steam delivery pipe 5, for the purpose of heating the contents of the water chamber.

Figure 7:
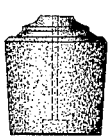
Fig. 7 is a side elevation of the finished candle body.

The top wall 6, of the chamber 2, is provided with wax-receiving reservoirs 7, in the form of depressions, having upwardly curved end surfaces 8, for facilitating the scraping operation, and in the bottom of each reservoir 7, screw threaded shouldered openings 9 are provided, for the reception of candle molds 10. Each candle mold 10 comprises a convergent hollow cylindrical body portion 11, interiorly shouldered at 12, to form a seat for the cap 13, the said cap having a filling opening or sprue 13' in its top and the cap forms a matrix for the top or head of the candle, imparting to the same the desired ornate form, (see Fig. 7). At its lower interior, the body portion 11 is provided with a shoulder 14, to form a seat for a plunger-head 15, the upper surface of said plunger-head forming the bottom of the candle mold. Below the shoulder 15, the body portion 11 is provided with a reduced tubular extension 16, and below this extension an additional reduced screw threaded tubular extension 17, which passes through an opening 18, in the bottom wall 19, of the chamber 2; water-tight clamping means being provided at 20, to secure said extension 17 and its mold 10 in rigid and water-tight position with respect to the walls of the chamber 2.

The plunger-head 15 has a tubular plunger stem 21 slidably fitting within the extension 17 for a vertical movement therein, and the lower end of the stem projects loosely through an opening 17' in a plate 24, and is drilled at 22 for the reception of a lock-rod 23, the said rod passing through similar openings in each stem 21 of a series of plungers of a gang or series of molds set in alinement. The lock rod 23 abuts the under surface of the plate 24 to re-seat the plunger-head at the bottom of the mold after the discharging operation. This plate 24 and a similar plate 25 are spaced a predetermined distance from each other by suitable spacing thimbles 26, and bolts 27 pass through the thimbles 26 and through a follower frame 28 and rigidly attach the said plates to said frame. The plate 25 is provided with openings 29 for the reception of the lower hollow cylindrical base 30, of the piercing-needle 31, the said needle passing upwardly through the stem 21 and plunger-head 15 to a point within the mold 10 (see Figs. 3, 4, and 5). The base 30 is drilled at 32 for the reception of a lock-rod 33, similar in construction to the lock-rod 23.

Figure 1:
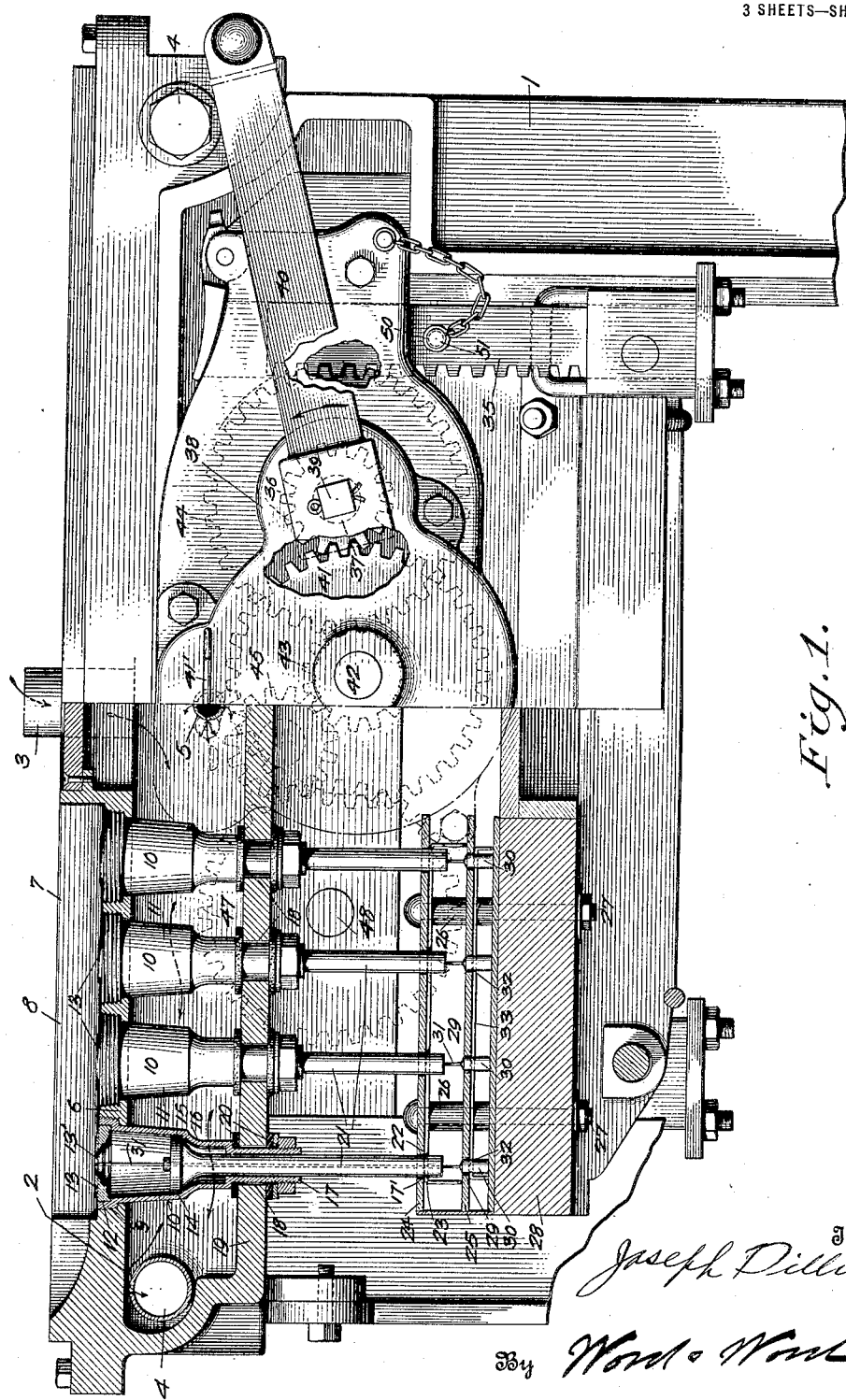
Figure 1 is a combination vertical transverse section and end view of my machine.
Figure 2:
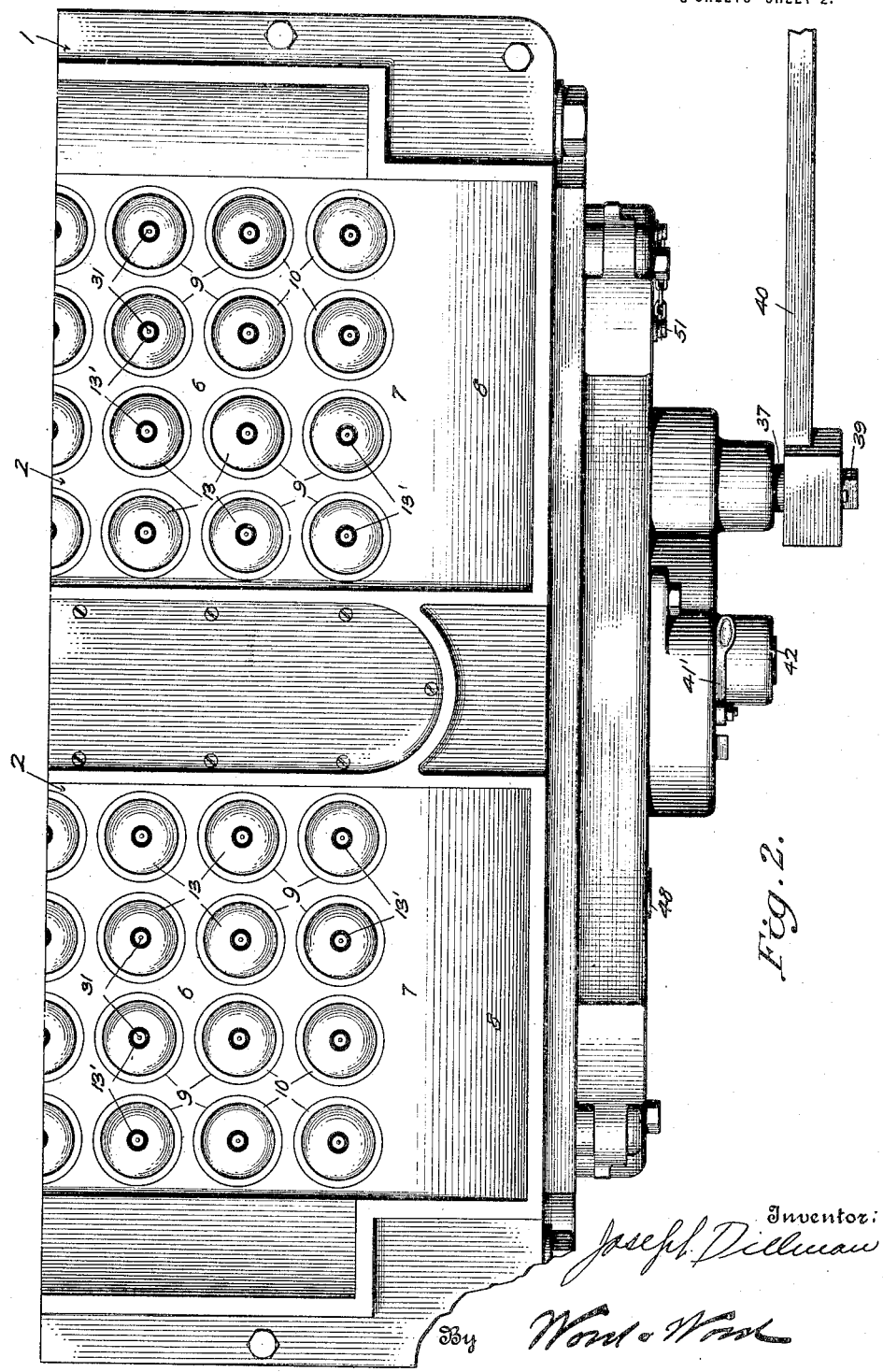
Fig. 2 is a fragmentary top plan of the same.

The follower frame 28 is provided with elevating means, which may represent any well-known type of construction, but under the preferred arrangement, consists of four racks 35 rigidly connected to the frame and respectively at the frame corners thereof. At one end of the machine, I provide gearing for operating said racks to raise and lower the said follower-frame. The gearing comprises at one end of the machine, (see Figs. 1 and 2), a small spur-gear 36, suitably keyed to a shaft 37, journaled in the end of the frame 1, and in the casing 38, and the said shaft 37 has a squared end extension 39 for the reception of an operating-handle 40. The gear 36 meshes with a large spur-gear 41, keyed to a shaft 42, the said shaft having keyed thereon at its rear a small gear 43, meshing with a large gear 44, mounted for rotation on the shaft 37, and with an idler-gear 45 meshing with a gear 47, mounted for rotation on a stud-shaft 48, stepped in the frame 1. The gear 47 meshes with one of the racks 35, and the gear 44 meshes with the opposite rack. The shaft 42 extends the full length of the machine and is provided with a gear similar to the gear 43, forming part of a gear train similar to that at the front of the machine for operating all racks 35 simultaneously.

The right hand rack 35 (see Fig. 1) is provided with an opening 50, for the reception of a slip-pin 51, for limiting the upward movement of said racks, follower-frame 28, and the piercing-needles during the filling operation, the said slip-pin being flexibly connected to the frame 1. The gear 41 has mounted for coaction therewith a pawl 41', pivoted to the casing 38, for the purpose of holding the mechanism in position during the filling operation.

Figure 3:
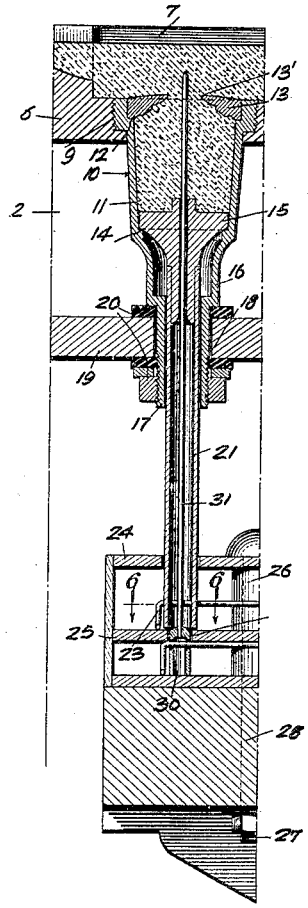
Fig. 3 is an enlarged vertical transverse section of one of the molding and piercing units, showing the position of the parts during the pouring operation.
Figure 4:
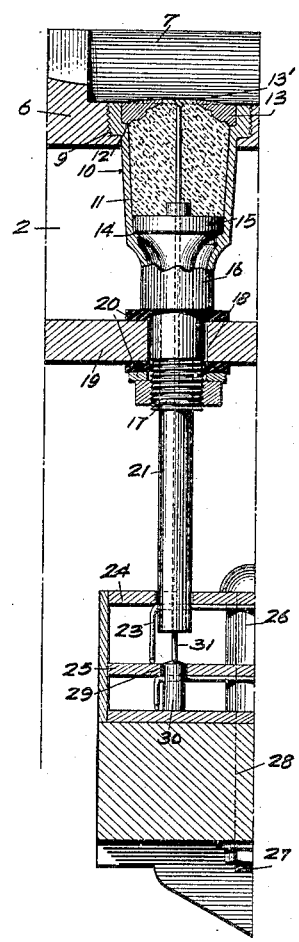
Fig. 4 is a view similar to Fig. 3, showing the position of the parts after the scraping operation.
Figure 5:
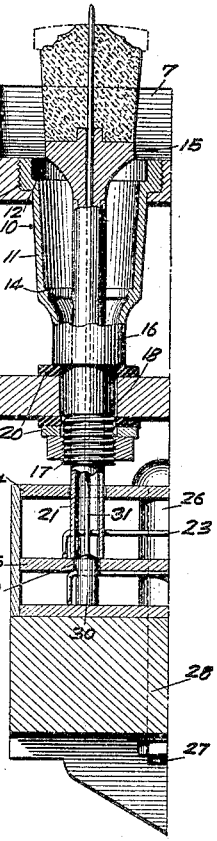
Fig. 5 is a view, similar to Fig. 3, showing the position of the parts when delivering the finished candle body, the same being ready for the insertion of the wick.
Figure 6:
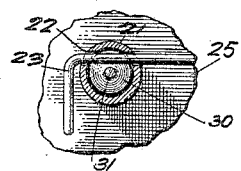
Fig. 6 is a horizontal sectional view on the line 6—6, of Fig. 3, showing the arrangement of the locking rod, relative to the plunger stem and to the piercing needle.

The operation of my machine is as follows:

The plural deck follower frame, as the initial step, is elevated slightly to a position which will raise the core and piercing needles of all the molds, projecting the pointed ends of the needles beyond the mold caps into the filling or pouring trough, as shown in Fig. 3, but which will not disturb the mold bases from their normal position within the bottom of the molds. The candle stock, with the needles in their elevated position, is formed into the trough filling the molds. After the candle stock in the mold has set and hardened sufficiently, the follower deck is lowered to bring the points of the needles below the upper plane of the mold caps for the trough scraping step, removing the surplus stock from the upper face of the mold caps and base of the trough. Such scraping or wiping operation results in plugging the sprue or tip end of the candle wick base of the candle, as shown in Fig. 4, which must be pricked or punctured before the wick can be freely inserted through the base. After the trough scraping operation, the candles are ready to be discharged from the mold, which is accomplished by elevating the follower frame to its full or required height, and as the follower frame is elevated, the lowermost deck of the follower will initially engage the base knobs 30 of the piercing-needles, raising the needles in advance of the candle extracting plungers. This action will cause the needle points to be again projected beyond the upper plane of the mold caps, piercing the plugged sprue or top of the candle and clearing the base opening through the candle. As the follower continues upward, the second deck 25 will engage with the plunger or mold base stems, elevating the same and the molded candles sustained upon the mold base, discharging the candles from the molds, as shown in Fig. 5. In a retreat movement of the follower, the elevated candle mold parts are forcibly loosened by the following means of the tie rods 23, 33. Tie-rod 23 engages through an alined series of stems and is engaged by the upper or top deck 24 of the follower, drawing the same therewith, and the needle moved by the tie rod 33 is engaged against the lower surface of the intermediate or second deck 25.

Having described my invention, I claim:

1. In a candle molding machine comprising a tubular mold member, a movable mold base adapted to seat within said mold member, a wick core and piercing needle concentrically engaging through said base and within said mold member, and unitary elevating means coöperating with said base and needle for independent needle elevating control and simultaneous needle and base elevating control.

2. In a candle molding machine comprising a tubular mold member, a movable mold base adapted to seat within said mold member, having a tubular depending stem, a wick core and piercing needle concentrically engaging through said base and stem, and within said mold member, and unitary frame elevating means independently coöperating with said stem and needle for independent needle elevating control and simultaneous needle and stem elevating control.

3. In a candle molding machine comprising a tubular mold member, a mold cap removably engaged within the head end of said mold member, a plunger mold base adapted to seat within said mold member, a wick core and piercing needle concentrically engaging through said plunger mold base and within said mold member, and single frame elevating means for said plunger mold base and needle, arranged to operate advancedly upon said needle in an elevating control of said base and needle.

4. In a candle molding machine comprising a tubular mold member, a candle ejector and mold base within said mold member, a wick core and piercing needle concentrically engaging through said mold base and within said mold member, and unitarily movable base means for reciprocating said needle to project its end above and below the top of said mold member, and elevate mold base for ejecting the candle from the mold member.

5. In a candle molding machine comprising a tubular mold member, a mold cap removably engaged within the head end of said mold member, a candle ejector and mold base seating within said mold member, a wick core and piercing needle concentrically engaging through said mold base and within said mold member, and unitarily operable frame means for reciprocating said needle to project its end above and below the top sprue plane of said cap and simultaneously elevate said needle and mold base for ejecting the candle from the mold member.

6. In a machine of the class described, the combination of a frame supporting a hollow water chamber, rigidly mounted molding elements traversing said chamber, plungers with plunger-stems within said molding elements, adapted for vertical movement therein, piercing needles, plunger-stems and molding elements, and unitary frame means for imparting movement to said piercing needles, plungers and plunger stems.

7. In a machine of the class described, the combination of a frame supporting a hollow water chamber, rigidly mounted molding elements traversing said chamber, plungers with plunger-stems within said molding elements adapted for vertical movement therein, piercing needles mounted for vertical movement within said plungers, plunger-stems and molding elements, piercing needle bases spaced from the plunger stems, means for imparting movement to said piercing-needles, plungers and plunger-stems, the said means comprising two rigidly spaced plates, one of the said plates being provided with openings for the reception of the plunger-stems, the second plate being provided with openings for the reception of the piercing needle bases, lock-rods extending through the lower ends of said plunger-stems, said lock-rods abutting the under side of one of the rigidly spaced plates, lock-rods extending through the piercing-needle ends and abutting the under surface of the other spaced plate, a follower-frame forming a base for said plates, and means for raising and lowering said follower-frame.

8. In a machine of the class described, the combination of a frame supporting a hollow water chamber, hollow molding elements traversing the water chamber, and mounted rigidly therein, hollow plungers and plunger stems rigidly attached to said plungers, the plungers being vertically movable within said molding elements, piercing-needles designed for vertical movement within said hollow plunger and bases therefor, plunger-stems and molding elements, means for imparting movement to said hollow plungers and plunger-stems, the said means comprising a follower frame, means for raising and lowering the same, a plate mounted upon said follower frame and provided with openings for the reception of the lower ends of the piercing needle bases, a second plate above the first plate rigidly spaced therefrom, provided with openings for slidably receiving the lower ends of the hollow plunger-stems, the lower surfaces of the said hollow plunger-stems being spaced from the upper surface of the lower plate a sufficient distance to allow a predetermined vertical movement of the follower frame and of the said piercing needles, and means for limiting the upward movement of said follower-frame.

9. In a machine of the class described, the combination of a frame supporting a hollow water chamber, hollow molding elements traversing the water chamber, and mounted rigidly therein, hollow plungers and plunger stems rigidly attached to said plungers, the plungers vertically movable within said molding elements, piercing-needles designed for vertical movement within said hollow plungers and bases therefor, plunger-stems and molding elements, means for imparting movement to said hollow plungers and plunger-stems, the said means comprising a follower frame, a plate mounted upon said follower frame and provided with openings for the reception of the lower ends of the piercing-needle bases, a second plate above the first plate, provided with openings for slidably receiving the lower ends of the hollow plunger-stems, the lower surfaces of the said hollow plunger-stems being spaced from the upper surface of the lower plate a sufficient distance to allow vertical movement of the said piercing-needles independently of the movement of the plunger-stems, means for limiting the upward movement of said follower frame and said needles, said means comprising racks attached to said follower-frame, gearing coacting with said racks, one of the racks provided with an opening, a pin inserted in said opening, a casing inclosing said gearing and rack, the lower portion of said casing acting as a stop for said pin.

10. In a candle molding machine, the combination of a frame supporting a hollow water chamber, hollow molding elements rigidly mounted and traversing said water chamber, plungers with hollow plunger-stems adapted for movement within said molding elements, wick-opening piercing-needles and bases therefor, adapted for movement within said hollow plunger-stems, means for raising and lowering said plungers, hollow plunger-stems and wick-opening piercing-needles, means for raising and lowering the said piercing-needles a predetermined distance independently of the plungers and hollow plunger-stems, the said means comprising a follower-frame, upper and lower plates rigidly mounted upon said frame, the said plates being rigidly spaced from one another, openings in the upper plate for the sliding reception of the drilled lower ends of the hollow plunger-stems and openings in the lower plate for the reception of the drilled lower ends of the piercing-needle bases, means for locking the drilled lower ends of the said hollow plunger-stems beneath the upper plate, and means for locking the piercing-needle bases below the lower plate, the said means comprising rods traversing the said drilled lower ends of the said hollow plunger-stems and of the said drilled lower ends of the piercing needles.

In witness whereof I hereunto subscribe my name, as attested by the two subscribing witnesses.

JOSEPH DILLMAN.

Witnesses:
EDWARD J. CONNORS,
HAROLD ARMACOST.